United States Patent [19]

Krigmont et al.

[11] Patent Number: 5,024,171
[45] Date of Patent: Jun. 18, 1991

[54] REDUCTION OF ACIDIC EMISSIONS FROM COMBUSTION OF SULFUR-LADEN FUELS

[75] Inventors: Henry V. Krigmont, Seal Beach; Everett L. Coe, Jr., Downey; Barry J. Southam, Irvine, all of Calif.

[73] Assignee: Wahlco, Inc., Santa Ana, Calif.

[21] Appl. No.: 496,872

[22] Filed: Mar. 19, 1990

[51] Int. Cl.$^5$ .................... F23J 11/00; F23J 15/00
[52] U.S. Cl. ................................ 110/345; 110/344; 423/242
[58] Field of Search .................. 110/345, 343, 344; 423/242

[56] References Cited

U.S. PATENT DOCUMENTS 4,051,225  9/1977  Shiga et al. ............... 110/345 X
4,793,268  12/1988  Kukin et al. .............. 110/345 X Primary Examiner—Edward G. Favors
Attorney, Agent, or Firm—Howard E. Sandler; Gregory O. Garmong

[57] ABSTRACT

The sulfur trioxide in the combustion gas stream of a power plant is reacted with injected ammonia to produce a solid ammonium sulfate that is captured, and not released to the atmosphere. A feedforward signal indicative of the total mass flow of sulfur trioxide is determined as the product of the measured boiler load and the sulfur trioxide content of the combustion gas, as measured prior to the addition of ammonia. The ammonia mass flow injection rate is preferably at a normal stoichiometric ratio of from about 1.0 to about 1.1 relative to the sulfur trioxide mass flow rate (that is, from about 2.0 to about 2.2 times the molar mass flow rate of the sulfur trioxide), avoiding the production of ammonia bisulfate. The ammonia content of the combustion gas stream is measured downstream of the location at which ammonia is added. Based upon this feedback measurement, the amount of ammonia added is adjusted to be just sufficient to react with all of the sulfur trioxide, but not in such excess as to be environmentally detrimental.

23 Claims, 2 Drawing Sheets

REDUCTION OF ACIDIC EMISSIONS FROM COMBUSTION OF SULFUR-LADEN FUELS

BACKGROUND OF THE INVENTION

This invention relates to the control of emissions resulting from the combustion of sulfur-laden fuels, and, more particularly, to the reduction of sulfuric acid emissions from power plants.

In fossil-fuel power plants, coal, gas, or oil is combusted to heat air, which in turn boils water to form steam. The steam drives a turbine and thence an electric generator, producing electricity. Besides heat, the burning of the fuel produces gaseous pollutants, such as oxides of sulfur and nitrogen. Environmental protection laws mandate that the amounts of gaseous pollutants emitted from the power plant be maintained at acceptably low levels. Additionally, reaction products of the pollutants can damage the power plant apparatus. The present invention deals generally with the technology for controlling and minimizing the emission of sulfuric acid by such power plants.

Fossil fuels, particularly oil and coal, often contain a substantial amount of sulfur. When the fuel is burned in the combustor, the sulfur oxidizes to sulfur dioxide or sulfur trioxide. The sulfur trioxide combines with the moisture of the air to produce sulfuric acid vapor. When the combustion gases cool, either inside or outside the power plant, the sulfuric acid vapor condenses to liquid sulfuric acid. If the condensation is inside the combustion gas ducts of the plant, machinery such as valves, pumps, instrumentation, and pollution control equipment that are contacted by the combustion gas corrode, reducing their operating efficiencies and lives. If the condensation is outside the power plant, there may be environmental damage.

One approach to reducing the undesirable sulfuric acid emission is to inject ammonia into the combustion gas stream. The ammonia reacts with sulfur trioxide and water vapor to produce ammonium sulfate. If there is sufficient water vapor present and the ammonia is provided in an amount of two moles of ammonia for each mole of sulfur trioxide, in theory the sulfur trioxide is completely reacted and removed from the combustion gas stream.

It is important that the proper amount of ammonia be injected. If too much ammonia is injected, an excess of ammonia is present in the power plant emissions, which itself poses an environmental hazard. If too little ammonia is injected, the sulfur trioxide is reacted to ammonium bisulfate rather than ammonium sulfate, which can form a sticky liquid mass inside the ducts or on equipment, or sulfur trioxide is emitted to the atmosphere. Careful control of the ammonia injection mass flow rate is required to avoid any of these undesirable results.

In existing power plants that use this ammonia injection approach, the ammonia content of the gas stream is measured downstream of the ammonia injection location to determine whether excess ammonia is present. If so, the ammonia flow rate is reduced until the excess disappears. This approach has the shortcoming that, even when there is no excess of ammonia, there may still be insufficient ammonia to ensure that the reaction product is ammonium sulfate rather than ammonium bisulfate. Finally, because of system lag times it is often difficult for the instrumentation to follow changes in sulfur trioxide mass flow rates, so that there may be a continuing imbalance that results in either sulfuric acid or ammonia emissions at various times.

There is a need for an improved control approach for use in the emission-control systems of power plants and other facilities that burn fuels having moderate or high sulfur contents. This approach should ensure that neither sulfur trioxide nor ammonia is present in an excess, both during steady state and transient operation, and that sulfur trioxide is reacted to ammonium sulfate rather than ammonium bisulfate. The present invention fulfills this need, and further provides related advantages.

SUMMARY OF THE INVENTION

The present invention resides in an approach for controlling the addition of ammonia to combustion gases containing sulfur trioxide, such as found in many conventional power plants. The approach provides precise control of the content of the combustion gas stream, so that there is virtually no sulfur trioxide, sulfuric acid, or ammonia emitted to the atmosphere. The ammonia addition mass flow rate is adjusted responsive to the sulfur trioxide mass flow rate with a minimal lag time, thereby reducing the time when non-optimal additions are made. The approach is readily implemented utilizing commercially available components.

In accordance with the invention, a process for neutralizing at least a portion of the sulfur trioxide in a gas stream resulting from the combustion of fossil fuels in a boiler comprises the steps of measuring a combustion gas stream at a first location to determine the sulfur trioxide content of the combustion gas stream; and adding ammonia to the combustion gas stream at a second location downstream of the first location in an amount responsive to the sulfur trioxide content determined in the step of measuring.

The sulfur trioxide mass flow rate in the combustion gas stream is preferably determined from the product of two measurements, the total gas mass flow rate determined from boiler load and the sulfur trioxide concentration (content) of the combustion gas stream measured at the first location upstream of the second location where ammonia is added. Ammonia is injected into the combustion gas stream at the second location along a gas conduit leading from the combustor. The molar mass flow rate of ammonia injected is calculated to be at least about 2.0 times the molar mass flow rate of the sulfur trioxide, and preferably from about 2.0 to about 2.2 times the molar mass flow rate of the sulfur trioxide. Or, stated alternatively, the mass flow rate of the ammonia is such that the normal stoichiometric ratio (NSR) of ammonia relative to sulfur trioxide is at least 1.0, and preferably from about 1.0 to about 1.1.

A quantity indicative of the total combustion gas mass flow rate (as in pounds per second) is measured and combined with the sulfur trioxide content (such as in mass percent or parts per million by weight) of the combustion gas stream as a feedforward control signal indicative of the total mass flow rate of sulfur trioxide in the combustion gas stream. A quantity that is relatable to the total combustion gas mass is generally termed a "boiler load", although it may be a quantity such as fuel flow to the combustor, electrical power output of the plant, or feed water flow rate in the boiler. The selected boiler load signal may not be a direct measure of the gas mass flow of the combustion gas stream, but it is readily calibrated to the combustion gas mass flow during initial trials of the combustion gas system. Alternatively, the measurements and calculations can be done on a volume basis and ultimately converted to a mass basis, if desired.

In accordance with a further aspect of the invention, a process for controlling the composition of a combustion gas stream of a power plant to which ammonia is added comprises the steps of adjusting the flow rate of the ammonia such that the molar flow rate of the ammonia is from about 2.0 to about 2.2 times the molar flow rate of sulfur trioxide in the combustion gas stream prior to the addition of the ammonia; measuring the ammonia content of the gas stream at a location downstream of the location at which ammonia is added; and trimming the flow rate of the ammonia added in the step of adding based upon the measurement of ammonia content in the step of measuring. In this aspect of the invention, an ammonia feedback signal is provided from a downstream location and used to control the ammonia addition. The ammonia content should be controlled to a preselected value of zero or slightly greater than zero, ensuring that ammonia exhausted to the atmosphere is minimal.

The feedforward control signal of sulfur trioxide flow rate is used by the control system as a coarse indicator of the amount of ammonia to be injected. With a system that uses a feedback signal only, there may be considerable lag times in reaching equilibration when the sulfur trioxide loading of the combustion gas stream changes. The feedback signal of ammonia content provides a basis for fine adjustment of the amount of ammonia to be injected, as suggested by the term "trimming".

If the sulfur trioxide mass flow rate in the gas flow stream suddenly changes significantly due to a change in the power output of the plant, nature of the fuel, or some other operating parameter, the combination of the feedforward and feedback signals aid in returning the residual sulfur trioxide and ammonia levels in the gas stream to low, substantially zero amounts, in a short time. The signals also ensure that the ammonia injection is optimal during steady state operation. The establishment of a minimum ammonia molar mass flow rate ensures that there will be minimal sulfur trioxide emission, while the feedback control of ammonia content ensures that there will be minimal ammonia emission to the environment.

Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
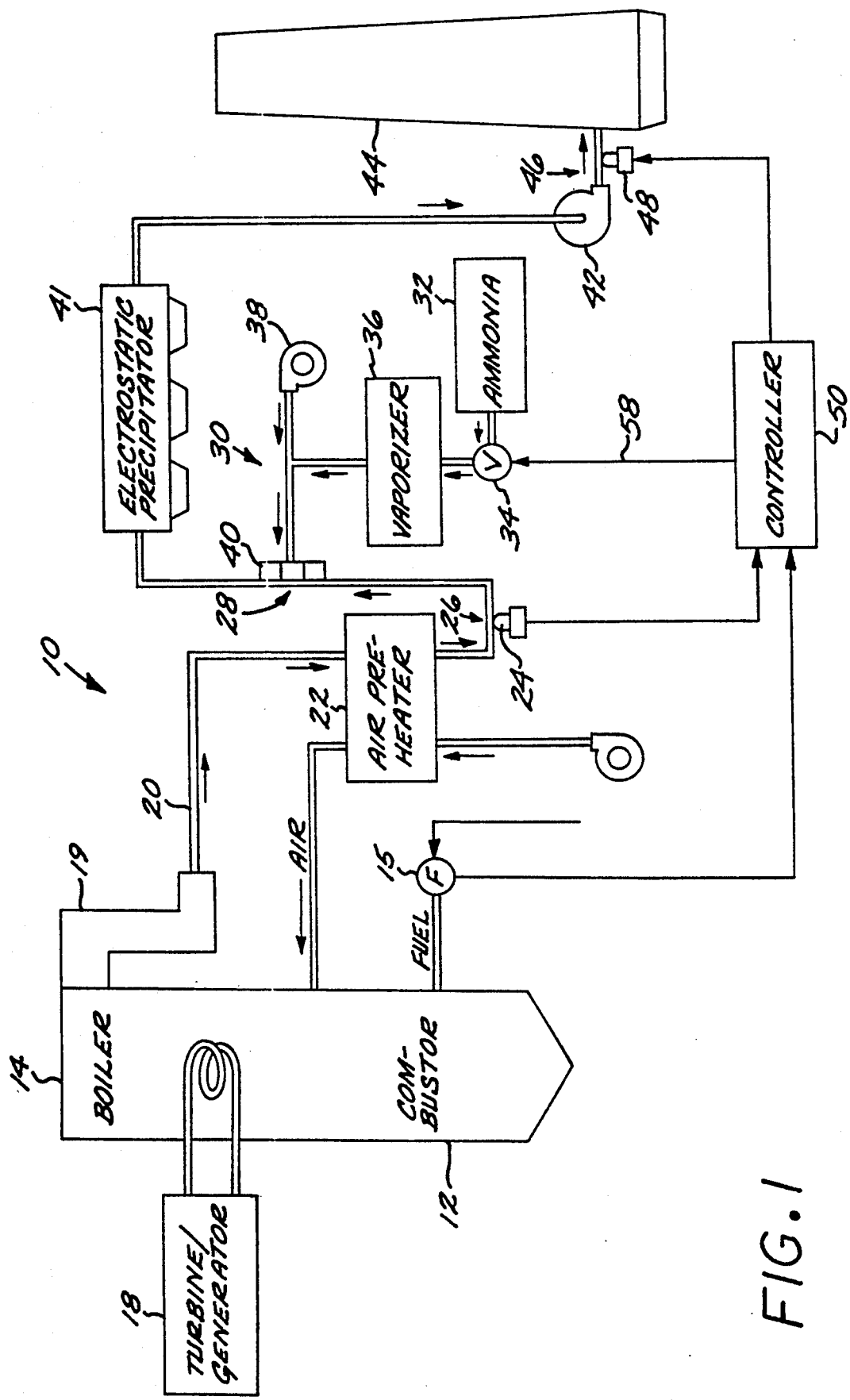
FIG. 1 is a schematic diagram of a combustion gas system with controlled ammonia injection.

In accordance with a preferred aspect of the invention, a process for controlling the composition of a combustion gas stream comprises the steps of measuring a boiler load signal proportional to a total flow rate of the combustion gas stream; measuring a sulfur trioxide content of the combustion gas stream; determining a control signal proportional to the product of the boiler load signal times the sulfur trioxide content of the combustion gas stream; adding ammonia to the combustion gas stream at a location downstream of the location at which the sulfur trioxide content of the combustion gas stream is measured, in an amount proportional to the control signal; measuring the ammonia content of the combustion gas stream at a location downstream of the location at which ammonia is added to the combustion gas stream; and trimming the flow rate of ammonia added in the step of adding ammonia such that the amount of ammonia measured in the step of measuring the ammonia content is at a preselected value.

In a fossil-fuel power plant 10 a fuel such as oil or gas is burned by a combustor 12, and the resulting hot flue or combustion gas is passed through a boiler 14, where it heats and boils water. The fuel flow to the combustor 12 is measured by a boiler load sensor 15, here a flow meter. The boiler load sensor 15 provides an indication of the total amount of combustion gas flowing through the boiler and thence to the exhaust, as in mass or volume per unit time.

The steam generated in a loop 16 flows to a turbine-generator set 18, where electricity for consumption is produced. The steam is condensed, and the water flows back through the loop 16.

The combustion gas from the boiler 14 passes through an economizer 19. The hot combustion gas stream leaving the boiler/economizer, denoted by the numeral 20, passes through an air preheater 22, where heat is transferred from the gas stream 20 to a forced flow of incoming air flowing to the combustor 12. The preheater 22 cools the combustion gas stream 20, typically from a temperature of about 750° F. to a temperature of about 290°–300° F.

The sulfur trioxide content of the combustion gas stream 20 is measured by a sulfur trioxide sensor 24 at a first location 26. The first location 26 is in the combustion gas flow stream 20, preferably after the gas has passed through, and been cooled in, the preheater 22. The sensor 24 measures fractional sulfur trioxide content of the gas stream 20, such as in mass or volume percent, or in parts per million by mass or volume. Such sensors are commercially available, and an acceptable sensor is the Severn Sciences Ltd. Model SSL/MEL.

Ammonia vapor is injected into the combustion gas stream at a second location 28 by an ammonia injection system 30. The second location 28 is downstream of the first location 26 and the sulfur trioxide sensor 24. The term "downstream" is used herein in the conventional sense, meaning that a location in the gas stream is further from the combustor 12 than a location to which it is compared, the distance being measured along the gas flow path. "Upstream" refers to a location closer to the combustor 12 than another location, also measured along the gas flow path.

Ammonia vapor is supplied to the injection system 30. Liquid anhydrous ammonia ($NH_3$) is stored in a tank 32. Liquid ammonia in an amount controlled by a valve 34 flows from the tank 32 to a vaporizer 36, which heats the liquid ammonia and causes it to vaporize. The flow of ammonia vapor from the vaporizer 36 is mixed into a forced stream of air flowing from a blower 38. The stream of gaseous ammonia entrained in air is forced to a number of injection probes 40, which extend into the combustion gas stream 20. Gaseous ammonia is thereby supplied to the gas stream 20 in a controllable amount, upon demand, by controlling the valve 34.

The ammonia-conditioned combustion gas stream 20 flows through a dust-collection apparatus 41, such as an electrostatic precipitator, to a blower 42, which forces the combustion gas stream into a stack 44 and thence to the atmosphere.

At a third location 46, downstream of the second location 28, an ammonia sensor 48 measures the ammonia content of the combustion gas stream 20, such as in percent by mass or volume or parts per million by mass or volume. A commercially available and acceptable ammonia sensor 48 is the Model C900 available from Horiba Corp.

The readings of the sensors 15 and 24 (and optionally 48) are provided to a controller 50, which is preferably a programmed microcomputer that adjusts the flow rate of ammonia provided to the combustion gas stream 20 by controlling the valve 34, according to procedures to be explained in detail subsequently. In general, however, the ammonia flow rate is controlled so that the total mass flow rate of ammonia in moles is at least about 2.0 times the mass flow rate in moles of the sulfur trioxide, and so that the residual ammonia measured by the sensor 48 is some preselected small amount, at or near zero. (The controller 50 will usually also have other functions in the control of the power plant that are not relevant to the operation of the present invention, and are therefore not addressed.)

The combustion gas stream normally contains an amount of sulfur trioxide, $SO_3$. The sulfur trioxide reacts with moisture (water vapor, $H_2O$) in the combustion gas stream to produce sulfuric acid, $H_2SO_4$. The presence of excess sulfuric acid in the gas stream can be harmful due to its corrosive powers and potential for polluting the environment. The sulfuric acid is a vapor at temperatures above its dew point, which is about 200°-300° F. depending upon the amount of moisture and the concentration of the sulfur trioxide in the combustion gas stream. The sulfuric acid condenses to a liquid at or below this temperature range. Thus, depending upon operating conditions, it is unlikely that the sulfuric acid could condense upstream of or in the air preheater 22, which is operated above the dew point. Almost certainly at least a portion of the sulfuric acid would condense onto exposed portions of the apparatus 10 at locations downstream from the preheater 22, as the combustion gas stream cools further. Condensation of sulfuric acid on valves, instrumentation, or other exposed metallic surfaces would lead to hot corrosion of those metals and any sensitive components therein. If the sulfuric acid does not condense within the power plant 10, it is emitted to the atmosphere, an equally undesirable result.

Ammonia is injected into the combustion gas stream 20 to react with the sulfur trioxide and water vapor, producing ammonium sulfate, $(NH_4)_2SO_4$, according to the reaction $$2NH_3 + H_2O + SO_3 = (NH_4)_2SO_4$$

or ammonium bisulfate, $(NH_4)HSO_4$, according to the reaction $$NH_3 + H_2O + SO_3 = (NH_4)HSO_4,$$

thereby avoiding the formation of sulfuric acid.

In the first reaction to produce ammonium sulfate, two moles of ammonia are consumed for each mole of sulfur trioxide. The concept of a "mole" is an established chemical convention that provides a convenient method for expressing relations between the amounts of substances that react together. A mole of a substance is its atomic weight expressed in grams. Thus, a gram mole of ammonia weighs about 17 grams, and a gram mole of sulfur trioxide weighs about 64 grams. When a molar ratio of 2 moles of ammonia to one mole of sulfur trioxide is maintained, the injection rate is about 34 grams of ammonia for each 64 grams of sulfur trioxide in the gas stream. Similarly, for the second reaction to produce ammonium bisulfate, one mole of ammonia is consumed for each mole of sulfur trioxide, or about 17 grams of ammonia for each 64 grams of sulfur trioxide.

Yet another way of expressing the chemistries is through the normal stoichiometric ratio or NSR. The desired molar ratio of ammonia to sulfur trioxide is 2 to 1 to produce ammonium sulfate, which is defined as a normal stoichiometric ratio of 1.0. If the molar ratio of ammonia to sulfur trioxide falls to less than 2 to 1, the normal stoichiometric ratio becomes less than 1.0. The control procedure of the invention is designed to ensure that the molar ratio of ammonia to sulfur trioxide is at least 2 to 1, or, alternatively stated, the normal stoichiometric ratio is at least 1.0.

Ammonium sulfate is produced as a fine powder which can be removed from the combustion gas stream with a filter or an electrostatic precipitator. Ammonium bisulfate, on the other hand, has significantly different chemical properties and may appear as a sticky substance that can deposit into gas passageways and obstruct them, requiring an expensive cleaning operation. To produce ammonium sulfate, the molar ratio of ammonia to sulfur trioxide is at least about 2 to 1. If the molar ratio is permitted to fall, as to less than about 2 to 1, ammonium bisulfate instead results. The present approach ensures that ammonium sulfate, not ammonium bisulfate, results from the injection of ammonia into the combustion gas stream.

Although the indicated chemistry is straightforward, there are practical obstacles to achieving a properly controlled ammonia addition. A change in the flow rate of the combustion gas stream produces a corresponding change in the mass flow rate of the sulfur trioxide. Similarly, a change in fuel mix or air flow to the combustor 12 or a number of other factors can cause changes in the mass flow rate of the sulfur trioxide. Because of the large mass of the power plant 10 and the nature of the chemical reactions, there is a delay time between a change in the mass flow rate of the sulfur trioxide and the time at which it is detected and the mass flow rate of the ammonia changed accordingly.

Figure 2:
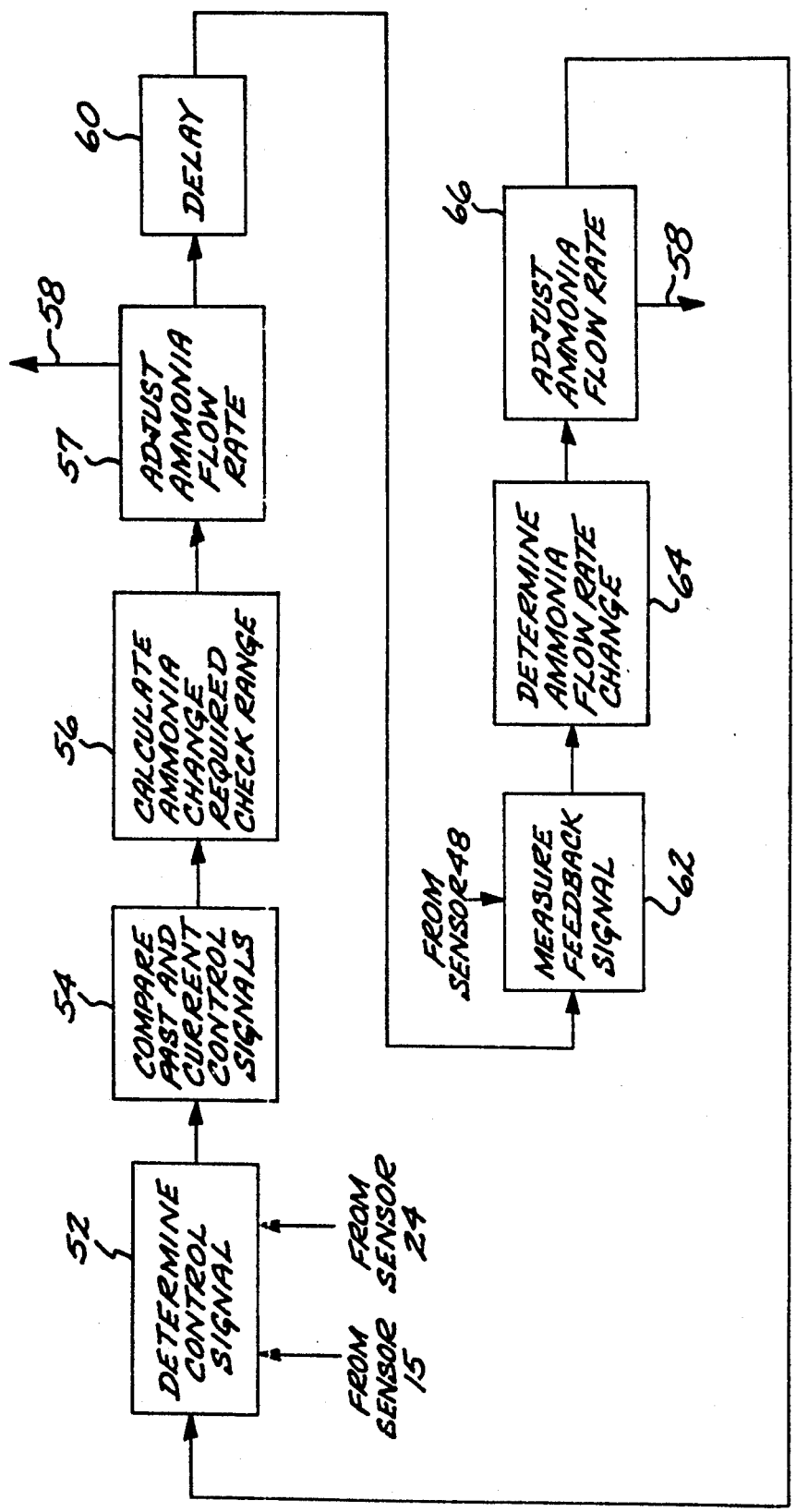
FIG. 2 is a flow chart for the control system of the apparatus of FIG. 1.

The present invention provides a control system preferably incorporating both feedforward (through the signals from the boiler load sensor 15 and sulfur trioxide sensor 24) and feedback control (through the ammonia sensor 48) of the mass flow of injected ammonia, which permits changes in the sulfur trioxide mass flow rate to be monitored closely, and the mass flow rate of the injected ammonia to be adjusted accordingly. These signals and control commands are integrated in the controller 50, and FIG. 2 illustrates the control procedure programmed into the controller.

A control signal is determined, numeral 52, as a combination of the feedforward signal from the boiler load sensor 15 and the feedforward signal from the sulfur trioxide sensor 24. The control signal is preferably the product of the signals from the sensors 15 and 24, multiplied by a calibration value as necessary. The calibration value is determined during initial breakin and calibration of the power plant 10.

The current value of the control signal is compared with the last reading of the control signal, numeral 54, or equivalently, time-averaged series of readings are compared. The sensors 15 and 24 are normally operated so that readings are obtained every few seconds. The readings are averaged over a time period of several minutes, to obtain a "reading" from which minor local fluctuations are excluded. The compare function 54 preferably compares the averaged readings taken several minutes apart.

Any required change in the ammonia mass flow rate due to the control signal is calculated at numeral 56. If the value of the control signal is the same as that determined previously, there would be no change in the ammonia flow rate resulting from the feedforward control signal. On the other hand, if there is a change in the current reading of the control signal as compared with the prior reading, the mass flow rate of ammonia injected through the probe 40 is adjusted proportionally through the setting of the valve 34. Thus, if the current control signal has increased by 10 percent from the prior reading, the mass flow rate of ammonia is increased by 10 percent. A linear adjustment is initially presumed, but operating experience of the power plant is readily substituted into the data base and control algorithm of the controller 50. For example, if experience gained from operating the plant shows that in some ranges an increase in the control signal of 10 percent should cause a responsive increase in the ammonia flow rate of only 8 percent, while in other ranges the responsive flow rate change should be 10 percent, thus reflecting a nonlinear relationship, this response behavior can be followed by the programmable controller 50.

The calculation 56 also checks the relative magnitudes of the sulfur trioxide and ammonia molar mass flow rates. As indicated previously, the molar mass flow ratio of ammonia to sulfur trioxide should be at least 2.0 (normal stoichiometric ratio of 1.0). If the actual ammonia mass flow rate is less than these required values, the mass flow rate of injected ammonia is increased to these values. In practice, the preferred molar mass flow rate of ammonia is from about 2.0 to about 2.2 times that of the sulfur trioxide (or, equivalently, the normal stoichiometric ratio is from 1.0 to 1.1), to maintain a very slight excess of ammonia to ensure that the sulfur trioxide is reacted to ammonium sulfate and not ammonium bisulfate.

The required adjustment in the ammonia mass flow rate, numeral 57, is made through a control cable 58 extending from the controller 50 to the ammonia control valve 34. In the preferred approach, the ammonia flow rate is adjusted by increasing or decreasing the flow rate through the injection system 30. Alternatively, but less preferably, the adjustment requiring an increased ammonia flow rate can be made through a secondary ammonia injection system (not shown).

After the adjustment in the ammonia flow rate, if any, made in response to the feedforward signal, there is a preset time delay 60. The apparatus being controlled is a large power plant that responds to changes in control parameters over a period of time, usually requiring minutes and sometimes as much as hours to reach a new equilibrium condition. The magnitude of the time delay 60 is selected, based upon plant operating experience, to permit a new equilibrium condition to be approached after a change to the feedforward signal. The delay time may be made variable, as to depend upon the magnitude of any prior change. The important result of using the feedforward signal is that the ammonia flow rate is roughly adjusted to match the change in the feedforward signal. If only a feedback signal is used, there would be a considerably longer time required for the adjustment of the ammonia flow to the correct value responsive to major plant output changes. With the feedforward control signal, the ammonia flow is immediately adjusted to be approximately correct, and then the feedback signal is utilized to attain a precise control of the ammonia flow rate as steady state is approached.

After the time delay, a reading of the feedback signal is made, numeral 62, from the ammonia feedback sensor 48. As discussed earlier for the feedforward signal, a reading for the sensor 48 is usually made as the average of data taken over a period of several minutes. The flow rate change for the ammonia is determined, numeral 64, so that the reading of the feedback sensor 48 is controlled to some preselected small value. The preselected value may be zero or slightly greater than zero, to ensure a slight excess of ammonia to prevent ammonium bisulfate production. The mass flow rate is then adjusted, numeral 66, by sending the appropriate control signal from the controller 50 to the injection system 30 through the cable 58. This modification to the ammonia flow rate responsive to the feedback signal is termed "trimming" by analogy to the use of that term in other contexts to indicate what is normally a small corrective change in a signal.

Once the ammonia flow rate has been so adjusted, the control algorithm recycles to the determination of a new value for the feedforward control signal, numeral 52, and the process repeats. If appropriate, another delay period can be provided between the adjustment 66 and the determination 52, but this is not normally necessary.

This control approach, using both feedforward and feedback signals, has several important advantages. First, the boiler load sensor 15 and the sulfur trioxide sensor 24 are employed as the primary sensors, rather than the ammonia sensor, which is at this state of the art generally less reliable. Second, control is achieved so that the product of the reaction of ammonia with sulfur trioxide and water is ammonium sulfate, not ammonium bisulfate. A control algorithm based upon maintaining a minimum molar mass flow ratio of 2 to 1 or minimum normal stoichiometric ratio of 1.0 ensures that sufficient ammonia is present to form ammonium sulfate. When control is based solely upon a measured ammonia content, it is possible that the injected ammonia flow rate is sufficient only to produce ammonium bisulfate, an undesirable result.

Third, the system responds rapidly to changes in the combustion gas stream with a coarse adjustment, based upon the feedforward control signal, but then automatically seeks the optimum ammonia addition rate over longer term conditions, based upon the fine adjustment of the feedback trimming signal. Fourth, the system constantly controls about the optimum ammonia addition rate, so that varying conditions are constantly tested. This procedure ensures that the system will not reach some locally optimized ammonia addition rather than the globally optimized addition.

The present invention thus provides an advance in the art of reduction of undesirable gaseous emissions in combustion gas streams, and in particular the control of sulfuric acid produced in systems such as power plants that are fired with sulfur-laden fuels. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for neutralizing at least a portion of the sulfur trioxide in a gas stream resulting from the combustion of fossil fuels within a boiler, comprising the steps of:
   measuring a combustion gas stream at a first location to determine the sulfur trioxide content of the combustion gas stream;
   adding ammonia to the combustion gas stream at a second location downstream of the first location in an amount responsive to the sulfur trioxide content determined in the step of measuring; and
   measuring the ammonia content of the gas stream at a third location downstream of the second location.

2. The process of claim 1, wherein the step of measuring includes the substep of
   measuring a boiler load signal.

3. The process of claim 2, wherein the step of measuring includes the substep of
   measuring the sulfur trioxide concentration of the combustion gas stream.

4. The process of claim 3, wherein the step of measuring includes the substep of
   multiplying the measured boiler load signal times the measured sulfur trioxide concentration to generate a control signal.

5. The process of claim 4, wherein the amount of ammonia added in the step of adding is proportional to the control signal.

6. The process of claim 1, wherein ammonia is added in the step of adding ammonia in a normal stoichiometric ratio relative to sulfur trioxide of greater than about 1.0.

7. The process of claim 6, wherein the ammonia is added in a normal stoichiometric ratio of from about 1.0 to about 1.1.

8. The process of claim 1, wherein the ammonia is added as gaseous ammonia.

9. The process of claim 1, wherein the combustion gas stream is produced by a power plant.

10. The process of claim 1, including the additional step of
    trimming the ammonia addition in the step of adding ammonia to maintain the ammonia content measured in the step of measuring the ammonia content at a preselected value.

11. The process of claim 10, wherein the preselected value is zero.

12. A process for controlling the composition of a combustion gas stream, comprising the steps of:
    measuring a boiler load signal proportional to a total flow rate of the combustion gas stream;
    measuring a sulfur trioxide content of the combustion gas stream;
    determining a control signal proportional to the product of the boiler load signal times the sulfur trioxide content of the combustion gas stream;
    adding ammonia to the combustion gas stream at a location downstream of the location at which the sulfur trioxide content of the combustion gas stream is measured, in an amount proportional to the control signal;
    measuring the ammonia content of the combustion gas stream at a location downstream of the location at which ammonia is added to the combustion gas stream; and
    trimming the flow rate of ammonia added in the step of adding ammonia such that the amount of ammonia measured in the step of measuring the ammonia content is at a preselected value.

13. The process of claim 12, wherein the boiler load signal is the flow rate of fuel to the combustor.

14. The process of claim 12, wherein the preselected value is zero.

15. The process of claim 12, wherein ammonia is added in the step of adding ammonia in a normal stoichiometric ratio relative to sulfur trioxide of greater than about 1.0.

16. The process of claim 15, wherein the ammonia is added in a normal stoichiometric ratio of from about 1.0 to about 1.1.

17. The process of claim 12, wherein the ammonia is added as gaseous ammonia.

18. The process of claim 12, wherein the combustion gas stream is produced by a power plant.

19. A process for controlling the composition of a combustion gas stream of a power plant to which ammonia is added, comprising the steps of:
    adjusting the flow rate of the ammonia such that the molar flow rate of the ammonia is from about 2.0 to about 2.2 times the molar flow rate of sulfur trioxide in the combustion gas stream prior to the addition of the ammonia;
    measuring the ammonia content of the gas stream at a location downstream of the location at which ammonia is added; and
    trimming the flow rate of the ammonia added in the step of adding based upon the measurement of ammonia content in the step of measuring.

20. The process of claim 19, including the additional step of
    measuring the sulfur trioxide content of the gas stream at a location upstream of the location at which ammonia is added.

21. The process of claim 20, including the additional step of
    measuring a boiler load signal indicative of the total combustion gas flow.

22. The process of claim 21, including the additional step of
    multiplying the sulfur trioxide content times the boiler load signal, to determine a value proportional to the total sulfur trioxide molar flow rate.

23. The process of claim 19, wherein the flow rate of ammonia is trimmed such that the ammonia content measured in the step of measuring the ammonia content is greater than zero.

* * * * *